United States Patent
Di Pietro et al.

(10) Patent No.: US 11,271,749 B2
(45) Date of Patent: Mar. 8, 2022

(54) DYNAMIC PREAMBLES FOR ESTABLISHING SECURE COMMUNICATION CHANNELS

(71) Applicant: Qatar Foundation for Education, Science and Community Development, Doha (QA)

(72) Inventors: Roberto Di Pietro, Doha (QA); Savio Sciancalepore, Doha (QA); Gabriele Oligeri, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 67 days.

(21) Appl. No.: 16/845,614

(22) Filed: Apr. 10, 2020

(65) Prior Publication Data
US 2020/0328900 A1    Oct. 15, 2020

Related U.S. Application Data

(60) Provisional application No. 62/833,305, filed on Apr. 12, 2019.

(51) Int. Cl.
*H04L 9/32* (2006.01)
*H04W 12/06* (2021.01)
(Continued)

(52) U.S. Cl.
CPC ........ *H04L 9/3242* (2013.01); *H04L 63/0428* (2013.01); *H04L 63/123* (2013.01);
(Continued)

(58) Field of Classification Search
CPC . H04L 9/3242; H04L 63/123; H04L 63/0428; H04L 2209/80; H04W 12/0431; H04W 12/06; H04W 12/106
See application file for complete search history.

(56) References Cited

U.S. PATENT DOCUMENTS 9,014,153 B2 * 4/2015 Park ................. H04W 48/16
370/336
9,559,749 B2 * 1/2017 Ferguson ............... H04B 1/713
(Continued)

FOREIGN PATENT DOCUMENTS

WO    WO-03094417 A1 * 11/2003 ............. H04L 69/22
WO    WO-2012150883 A1 * 11/2012 ........ H04W 72/0486
(Continued)

*Primary Examiner* — Michael R Vaughan
(74) *Attorney, Agent, or Firm* — K&L Gates LLP

(57) ABSTRACT

The present disclosure provides systems and methods for enhanced wireless communication security. The preambles used for the identification of an upcoming wireless communication may be periodically changed (e.g., dynamic), on a time basis, based on a secret key function shared between the communicating parties. In this way, only the intended parties are able to recognize the start of an ongoing communication, synchronize with the transmitters, and access the information contained therein. An attacker, being unaware of the specific preamble sequence used for the synchronization, will not recognize the pattern of the communication, and thus will be unable to recognize when communications are ongoing. Additional authentication measures may also be implemented with the transmissions.

20 Claims, 6 Drawing Sheets

(51) Int. Cl.
*H04L 29/06* (2006.01)
*H04W 12/0431* (2021.01)

(52) U.S. Cl.
CPC ....... *H04W 12/0431* (2021.01); *H04W 12/06* (2013.01); *H04L 2209/80* (2013.01)

(56) References Cited

U.S. PATENT DOCUMENTS

| | | |
|---|---|---|
| 2004/0066740 A1 | 4/2004 | Suh et al. |
| 2009/0175258 A1 | 7/2009 | Wang et al. |
| 2011/0158104 A1 | 6/2011 | Frenger et al. |
| 2011/0294496 A1* | 12/2011 | Hirakawa ............. H04W 48/02 455/422.1 |
| 2014/0269667 A1* | 9/2014 | Teague .................... H04L 7/046 370/350 |
| 2018/0212799 A1 | 7/2018 | Wang et al. |
| 2018/0242367 A1 | 8/2018 | Kim et al. |
| 2018/0359066 A1 | 12/2018 | Mut et al. |
| 2018/0359784 A1 | 12/2018 | Agiwal et al. |
| 2019/0373463 A1* | 12/2019 | Chacko .................... H04K 1/00 |
| 2020/0235975 A1* | 7/2020 | Krunz ................ H04L 27/2613 |

FOREIGN PATENT DOCUMENTS

| | | |
|---|---|---|
| WO | 2018132796 A1 | 7/2018 |
| WO | 20180157932 A1 | 9/2018 |
| WO | 2018222226 A1 | 12/2018 |

* cited by examiner

DYNAMIC PREAMBLES FOR ESTABLISHING SECURE COMMUNICATION CHANNELS

PRIORITY CLAIM

The present application claims priority to and the benefit of U.S. Provisional Application 62/833,305, filed Apr. 12, 2019, the entirety of which is herein incorporated by reference.

BACKGROUND

Wireless communications are today widespread and offer crucial advantages over wired solutions. Due to the absence of any physical connections, wireless communications overcome limitations that result from unsuitable locations and physical obstacles to enable ubiquitous connectivity. Wireless communications require tight synchronization between communicating entities to enable such connectivity. In typical wireless communication technologies, this is achieved by prefixing transmitted information or messages with dedicated preambles. The preamble sequences are characterized by different contents and lengths, and they are meant to allow a receiver to synchronize with a transmitter and correctly reconstruct the information carried in a message. The choice of the particular preamble sequence is typically fixed for each communication technology and it is optimized based on the particular modulation scheme used at the physical layer, the operating frequency, as well as the length of the messages involved in the communications.

Due to the intrinsic nature of the wireless communication medium, wireless communications are exposed to a wide range of attacks that intend to interfere with the wireless communications. For example, an attacker may carry out an attack that intercepts the communications or prevents the communication from happening. Among these attacks, the most harmful may be considered jamming, eavesdropping, and man-in-the-middle attacks. A reactive jamming attack, for instance, involves an attacker or a device recognizing that communications are occurring, and in response, injecting interference into the communication channel so that the receiver cannot recognize the message.

Each of these harmful attacks is based on an attacker that is able to recognize the presence of ongoing communications, eventually analyze their pattern and, attempt to compromise the security of the communications. For instance, depending on the attacker's specific target, the attacker may jam the communication, impersonate a legitimate party, or eavesdrop on the communication, among other security-compromising activities. An attacker may achieve a successful attack by looking at the communication signal on a particular operating frequency and identifying the specific preamble sequence uniquely characterizing the particular communication technology so that the attacker may recognize when communications are ongoing. Accordingly, at least one vulnerability in typical wireless communications is that the preamble sequence is fixed. While a fixed preamble helps receivers optimally identify messages by receivers, the fixed preamble also enables attackers to identify ongoing communications enabling attackers to compromise the security of those communications.

Indeed, typical reactive jamming devices available on the market leverage the knowledge that communication technologies utilize a specific fixed preamble sequence. In particular, typical reactive jamming devices listen on a particular operating frequency used for the communication and, as soon as the device detects the presence of the target preamble sequence, the device starts jamming by emitting random noise. The random noise disrupts the quality of the communication. Typical solutions to evade reactive jamming are based on "network-oriented" schemes, where the network as a whole is able to escape jamming by taking advantage of a weakness of the attacker. For example, the network may utilize a set of frequencies that the attacker cannot jam at the same time or other physical limitations of the jammer. These typical solutions, however, do not provide security at the individual transmitter/receiver level.

Accordingly, a need exists for a solution to the above-identified problems.

SUMMARY

The present disclosure provides new and innovative systems and methods for enhanced wireless communication security. In an example, a system for transmitting and receiving a message includes a transmitting device and a receiving device. The transmitting device includes a memory in communication with a processor. The transmitting device's processor is configured to generate a first preamble sequence for a first time slot via a message authentication code based on the first time slot and a shared key. The first preamble sequence includes a plurality of bits. The transmitting device's processor is further configured to designate a first predetermined portion of bits of the first preamble sequence as a first effective preamble. The first predetermined portion of bits includes a first predetermined quantity of bits and a first predetermined location of the bits within the first preamble sequence. The transmitting device's processor then transmits the first effective preamble with a first portion of the message. The receiving device includes a memory in communication with a processor. The receiving device's processor is configured to generate the first preamble sequence for the first time slot via the message authentication code based on the first time slot and the shared key. The receiving device's processor identifies the first predetermined portion of bits of the first preamble sequence as the first effective preamble. The receiving device's processor receives from the transmitting device the first effective preamble with the first portion of the message. The receiving device's processor is configured to identify the first portion of the message.

In an example, a method for transmitting a message includes generating a first preamble sequence for a first time slot via a message authentication code based on the first time slot and a shared key. The first preamble sequence includes a plurality of bits. A first predetermined portion of bits of the first preamble sequence is designated as a first effective preamble. The first predetermined portion of bits includes a first predetermined quantity of bits and a first predetermined location of the bits within the first preamble sequence. The first effective preamble is transmitted with a first portion of the message. A second preamble sequence for a second time slot is generated via the message authentication code based on the second time slot and the shared key. The second preamble sequence includes a plurality of bits. The second time slot is subsequent to the first time slot. A second predetermined portion of bits of the second preamble sequence is designated as a second effective preamble. The second predetermined portion of bits includes a second predetermined quantity of bits and a second predetermined location of the bits within the second preamble sequence. The second effective preamble is transmitted with a second portion of the message.

In an example, a method for receiving a message includes generating a first preamble sequence for a first time slot via a message authentication code based on the first time slot and a shared key. The first preamble sequence includes a plurality of bits. A first predetermined portion of bits of the first preamble sequence is identified as a first effective preamble. The first predetermined portion of bits includes a first predetermined quantity of bits and a first predetermined location of the bits within the first preamble sequence. A first transmission is received that includes the first effective preamble with a first portion of the message. The first portion of the message is identified. A second preamble sequence for a second time slot is generated via a message authentication code based on the second time slot and the shared key. the second preamble sequence includes a plurality of bits. The second time slot is subsequent to the first time slot. A second predetermined portion of bits of the second preamble sequence is identified as a second effective preamble. The second predetermined portion of bits includes a second predetermined quantity of bits and a second predetermined location of the bits within the second preamble sequence. A second transmission is received including the second effective preamble with a second portion of the message. The second portion of the message is identified. The message is reconstructed based on the first portion and the second portion of the message.

DETAILED DESCRIPTION

Figure 1:
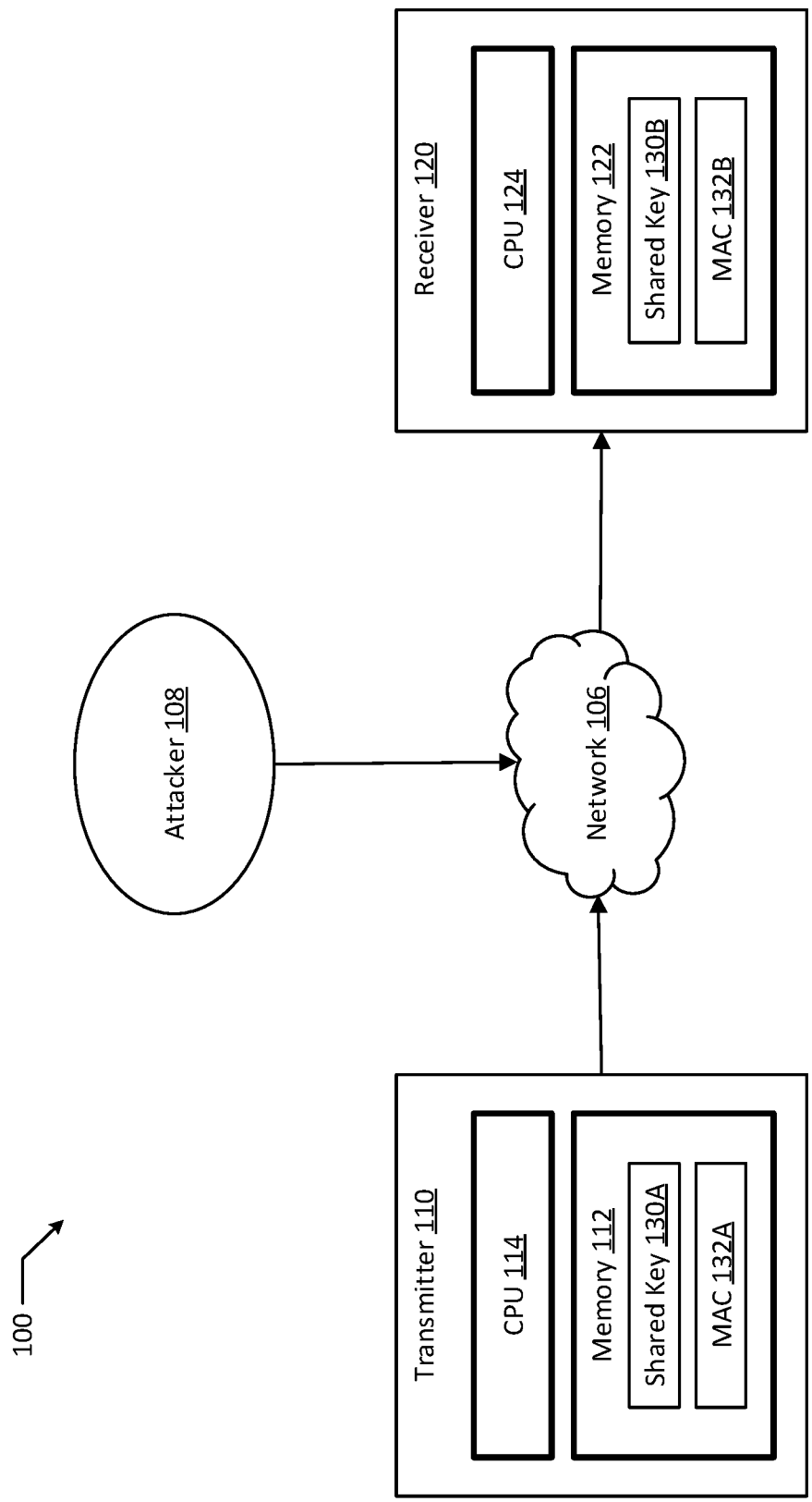
FIG. 1 illustrates a box diagram of an example wireless communication system, according to an aspect of the present disclosure.

The present disclosure provides systems and methods for enhanced wireless communication security. The preambles used for the identification of an upcoming wireless communication may be periodically changed (e.g., dynamic), on a time basis, based on a secret key function shared between the communicating parties. In this way, only the intended parties are able to recognize the start of an ongoing communication, synchronize with the transmitters, and access the information contained therein. An attacker, being unaware of the specific preamble sequence used for the synchronization, will not recognize the pattern of the communication, and thus will be unable to recognize when communications are ongoing. Accordingly, the attacker is unable to perform attacks on the communication, such as reactive jamming, impersonation, and eavesdropping. For instance, the attacker will not know when to emit random noise to jam a communication.

The dynamic preambles are randomized in a controlled way via a message authentication control function based on a time slot within which a communication takes place and a secret key shared between the communicating parties. The message authentication control function is also shared between the communicating parties. In this way, the adversary is unable to recognize or guess a preamble of any given communication. The presently disclosed methods may also include additional authentication measures for communicating parties to authenticate each other help ensure an attacker is not impersonating one of the communicating parties. For instance, communicating devices may recognize each other through the use of a specific dynamic preamble sequence. Additionally, the provided methods, in some instances, may reduce message bandwidth and accordingly the time required to transfer information. Moreover, the provided methods may be executed with minimal computational requirements, such as requiring a cost equivalent to a single symmetric encryption operation.

It should be appreciated that the provided methods may be implemented on any suitable wireless communication device, independent of the particular communication technology that the device utilizes. Moreover, the provided methods and systems can be applicable to a wide range of wireless communication applications. For example, these applications include military applications and information-critical communications such as industrial scenarios and IoT applications, where requirements such as robustness toward reactive jamming attacks and confidentiality, as well the reduction of the time necessary to transmit an information, are essential to provide the communication service. Additionally, cyber-physical systems and other generic wireless networks can take advantage of the disclosed methods and systems. For example, such cyber-physical systems and networks will be able to authenticate the communicating party in each communication without resorting to complex public key cryptography techniques, and will be able to enable a wireless communication channel capable of preventing reactive jamming attacks. Other wireless communication applications may include, but are not limited to, eHealth oriented communications, wireless body area networks (WBAN), and other environments where effective jamming-robust communications are needed.

As used herein, a "message authentication code" (MAC) refers to a cryptographic checksum on data that uses a session key to detect both accidental and intentional modifications of the data. A MAC requires two inputs: a message and a secret key known only to the originator of the message and its intended recipient(s). This allows the recipient of the message to verify the integrity of the message and authenticate that the message's sender has the shared secret key. If a sender does not know the secret key, the hash value would then be different, which would tell the recipient that the message was not from the original sender. There may be four types of MACs: (1) unconditionally secure, (2) hash function-based, (3) stream cipher-based, and (4) cipher-based.

FIG. 1 illustrates a box diagram of an example wireless communication system 100. The system includes a transmitter 110 that communicates information to a receiver 120 over a network 106. The network 106 may be any suitable wireless communication network, such as a wireless wide area network (WWAN), wireless local area network (WLAN), wireless personal area network (WPAN), or wireless body area network (WBAN). In some instances, the system 100 includes an attacker 108 that attempts to interfere with, or otherwise compromise the security of, the communication between the transmitter 110 and the receiver 120. For example, the attacker 108 may be a reactive jamming device that attempts a reactive jamming attack by continuously looking for the presence of a preamble so that it may begin emitting random noise on the communication channel between the transmitter 110 and the receiver 120.

The transmitter 110 and receiver 120 may each be any suitable device capable of wirelessly transmitting and receiving information. It should also be appreciated that while the transmitter 110 is described herein as configured for transmitting information, the transmitter 110 may be capable of both transmitting and receiving information according to the present disclosure. Likewise, it should be appreciated that while the receiver 120 is described herein as configured for receiving information, the receiver 120 may be capable of both transmitting and receiving information according to the present disclosure.

The transmitter 110 includes a processor in communication with a memory 112. The processor may be a CPU 114, an ASIC, or any other similar device. The memory 112 stores a shared key 130A, which may be any suitable cryptographic key. The memory 112 also stores a MAC 132A, which may be any suitable MAC. For example, the MAC 132A may be a hash function-based MAC that uses the secret shared key 130A in conjunction with a cryptographic hash function to product a hash.

The receiver 120 includes a processor in communication with a memory 122. The processor may be a CPU 124, an ASIC, or any other similar device. The memory 122 stores a shared key 130B, which is identical to the shared key 130A. The memory 112 also stores a MAC 132B, which is identical to the MAC 132A. The transmitter 110 and the receiver 120 may obtain the identical shared keys 130A and 130B in a number of ways. For instance, the shared keys 130A and 130B may be pre-shared, may be obtained through a key negotiation protocol, or other suitable ways. In most aspects of the present disclosure, the transmitter 110 and the receiver 120 are additionally time-synchronized, such as on a time slot basis. In such instances, each time slot may have a specific duration (e.g., seconds). The specific protocol used to maintain time synchronization between the transmitter 110 and the receiver 120 may be any suitable protocol known to one of skill in the art. For example, the transmitter 110 and the receiver 120 may be time-synchronized by generating time slot durations in accordance with pre-shared information (e.g., a seed).

The shared keys 130A and 130B are identical, the MACs 132A and 132B are identical, and the transmitter 110 and the receiver 120 may be time-synchronized so that the receiver 120 is able to recognize the messages that the transmitter 110 sends. For instance, the processor of the transmitter 110 may be programmed to generate a preamble sequence by inputting a time slot and the shared key 130A into the MAC 132A. The processor of the transmitter 110 may then designate a portion of the generated preamble sequence as an effective preamble, which is transmitted to the receiver 120 with a message and, in some instances, other information. The effective preamble is dynamic in that as the time slot changes, the generated preamble sequence changes and the effective preamble that the transmitter 110 transmits changes. In order for the receiver 120 to recognize a message sent by the transmitter 110, the receiver 120 must recognize the effective preamble transmitted by the transmitter 110.

To recognize the effective preambles transmitted by the transmitter 110, the processor of the receiver 120 may be programmed to generate a preamble sequence by inputting a time slot and the shared key 130B into the MAC 132B. The processor of the receiver 120 may then identify a portion of the generated preamble sequence as the effective preamble. The transmitter 110 and the receiver 120 share predetermined rules defining how the effective preamble is designated, for each respective time slot, from the generated preamble sequence, in addition to the other shared elements described above. An effective preamble may therefore dynamically change based on a respective time slot and on the predetermined rules for the respective time slot. For instance, the predefined rules may include a quantity of bits and/or a location of the bits. A location of bits may be, for example, the most significant bits, a set of bits in the middle of the generated preamble sequence, or any other suitable selection of bits. One having skill in the art will appreciate that the most significant bits or high-order bits refers to the bits in a binary number having the greatest value, which may be the left-most set of bits.

Due to the identical shared keys 130A, 130B, identical MACs 132A, 132B, time-synchronization, and predetermined rules, the processor of the receiver 120 is able to identify an effective preamble for a given time slot from a transmitter 110. The processor of the receiver 120 may therefore detect that a message is being transmitted from the transmitter 110 despite the effective preamble dynamically changing, and may identify the message.

At the same time, the attacker 108 is unable to recognize a preamble for the transmitted messages since the attacker 108 does not have access to the shared keys 130A, 130B or the MACs 132A, 132B, nor an identical copy of them, nor does the attacker 108 have access to the predetermined rules for designating an effective preamble. The attacker 108 also might not be time-synchronized to the transmitter 110 or the receiver 120. The attacker 108 will be unable to observe any pattern that prefixes messages on the communication channel between the transmitter 110 and the receiver 120 because the transmitter 110 is randomly changing the length and position of the effective preambles it transmits. Further, due to the nature of MACs, even if the attacker 108 were to obtain the MAC 132A or 132B (e.g., via a type of data attack), it is virtually computationally impossible for the attacker 108 to obtain an effective preamble without having a shared key 130A or 130B and the time slot in which the effective preamble was generated. Likewise, if the attacker 108 were to figure out an effective preamble and its respective time slot, it is also virtually computationally impossible for the attacker 108 to obtain the shared key 130A, 130B without the MAC 132A or 132B. The attacker 108 could therefore not recognize future effective preambles.

Figure 2:
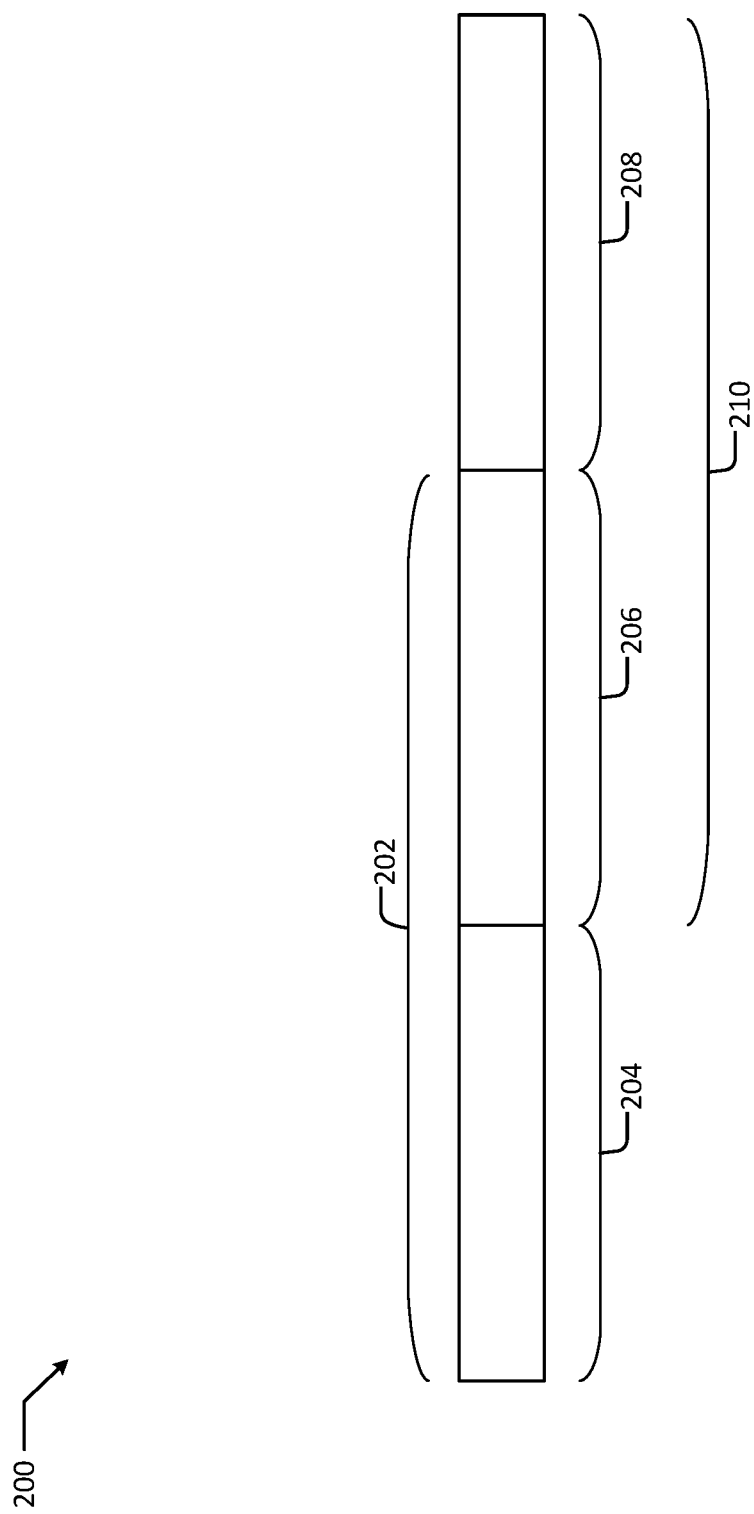
FIG. 2 illustrates a schematic of a bit string showing an effective preamble, according to an aspect of the present disclosure.

FIG. 2 illustrates a schematic of an example bit string 200 showing an effective preamble. The bit string 200 is divided into three separate sets of bits, though it should be appreciated that the bit string 200 may include additional bits beyond those described herein in order to conduct communications. In a typical communication, a particular communication technology may utilize a bit string 200 that includes a preamble length 202 of bits and a message length 208 of bits. The presently disclosed method, instead, utilizes a bit string 200 that includes an effective preamble length 204, a length of bits 206, and a message length 208 of bits. The length of bits 206 may be utilized for various applications, as will be described in more detail below. The effective preamble length 204 and the length of bits 206 add up to the preamble length 202 of the standard used for a particular communication type so as to make the communication compatible with the communication type. As stated above, in some instances, the effective preamble length 204 of a dynamic preamble may change based on a time slot within which it is generated. As the effective preamble length 204 changes, the length of bits 206 changes as well. The length of bits 206 and the message length 208 may combine to compose a payload length 210 of bits.

Figure 3:
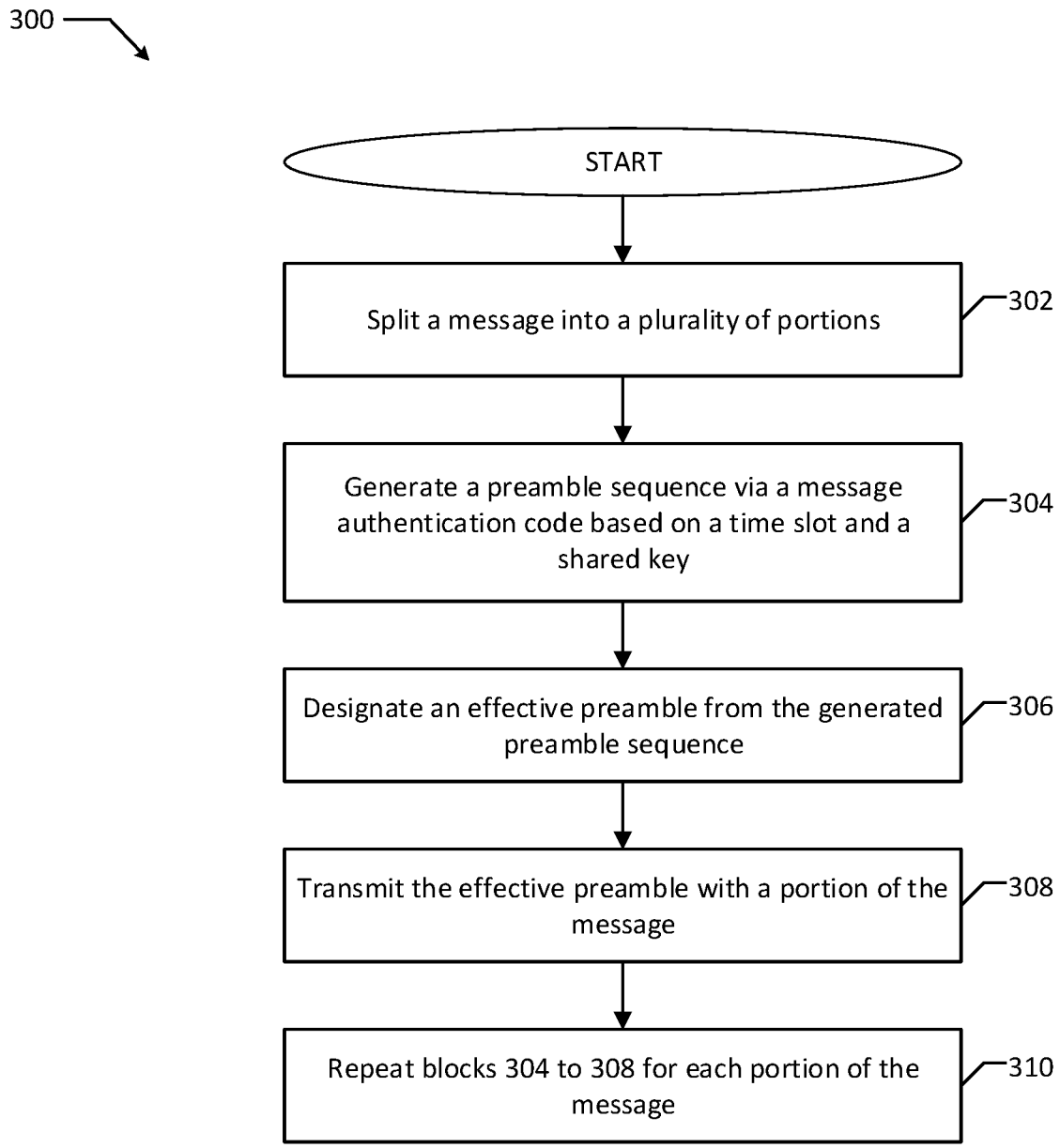
FIG. 3 illustrates a flowchart of an example method for transmitting a message with dynamic preambles, according to an aspect of the present disclosure.

FIG. 3 illustrates a flowchart of an example method 300 for transmitting a message with dynamic preambles. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

A message to be transmitted is split into a plurality of portions of the message (block 302). Each portion of the message includes a quantity of bits. The portions of the message may have an equal or unequal quantity of bits. In some aspects of the present disclosure, a message may be transmitted without being split. Splitting the message, however, may enable lengthier messages to be transmitted. Splitting the message may also enhance security of the wireless communication because the effective preambles change with each transmission of a portion of the message, decreasing the likelihood that an attacker 108 could eavesdrop on each transmission in order to decipher the message.

A preamble sequence is generated via a MAC based on a time slot and a shared key (block 304). In an example, the transmitter 110 is programmed to input a first time slot and the shared key 130A into the MAC 132A to obtain an output that is the preamble sequence. A portion of the generated preamble sequence is then designated as an effective preamble (block 306). As described above, the effective preamble is designated according to predetermined rules for the first time slot. For example, the transmitter 110 may be programmed to designate the four most significant bits of the generated preamble sequence as the effective preamble for the first time slot.

The effective preamble is then transmitted with a portion of the message (block 308). For example, the transmitter 110 may transmit a string of bits that includes the effective preamble followed by a first portion of the message to the receiver 120. After the first portion of the message is transmitted with its effective preamble, the process is repeated for each remaining portion of the message (block 310). For instance, the transmitter 110 may input a second time slot and the shared key 130A into the MAC 132A to obtain a preamble sequence. A portion of the preamble sequence is designated as an effective preamble based on the predetermined rules for the second time slot. In an example, the transmitter 110 may be programmed to skip the four most significant bits of the generated preamble sequence and designate the next seven bits as the effective preamble for the second time slot. The transmitter 110 may then transmit a string of bits that includes this effective preamble followed by a second portion of the message to the receiver 120. This process repeats until the transmitter 110 transmits each portion of the message.

In some aspects of the present disclosure, each portion of the message may be transmitted within its own respective time slot. In other aspects, more than one message portion may be transmitted within a single time slot. In such other aspects, the message portions transmitted within the same time slot have the same effective preamble. Each of the message portions may be transmitted in directly subsequent time slots or in some cases one or more time slots may elapse between transmitting portions of a message.

As described above, the transmitter 110 may transmit information over a communication channel without any additional security measures. Doing so may enhance availability at the receiver 120 since the receiver 120 may process information more quickly. In some instances, the transmitter 110 may be programmed to encrypt information prior to transmitting it to the receiver 120 in a way that is only recoverable by the party receiving the information at the receiver 120. Encrypting the transmitted information may enhance protection against eavesdropping attacks. The transmitter 110 may additionally or alternatively be programmed to enrich the transmitted information with a forward error mechanism (FEC), which may increase robustness against errors on the communication channel due to noise in the environment.

In some aspects of the present disclosure, the example method 300 may include transmitting an authentication measure with an effective preambles and a message. In such aspects, some bits of the transmitted string are dedicated to the authentication measure. In particular, the length of bits 206 of the example bit string 200 are dedicated to the authentication measure. Using bits of a standard preamble as the authentication measure helps to reduce the bandwidth required by the transmissions described herein.

In one example, the method 300 may include generating an authentication bits string via inputting an identifier and a secret shared key into a MAC. For instance, the transmitter 110 may have its own specific identifier or ID. The transmitter 110 may be programmed to generate an authentication bits string by inputting its identifier and the shared key 130A into the MAC 132A. A first set of bits of the authentication bits string may then be encoded. For example, the transmitter 110 may encode a first set of bits of the authentication bits string having a length equal to the length of bits 206 and add it to the string of bits for transmission. In an example, if a standard preamble length is twenty five bits and the effective preamble is designated as twelve bits in the predetermined rules for a respective time slot, then thirteen bits of the authentication bits string are encoded and added to the string of bits. As each portion of a message is transmitted, another portion of the authentication bits string is transmitted as well. The process may continue until each portion of the message and each portion of the authentication bits string are transmitted. As described above, because the lengths of the effective preambles may vary between transmissions, the lengths of the sets of bits of the authentication bits string may vary as well.

In another example, the example method 300 may include generating an authentication bits string via inputting the message and a secret shared key into a MAC. For instance, the transmitter 110 may be programmed to generate an authentication bits string by inputting the message to be transmitted and the shared key 130A into the MAC 132A. The transmitter 110 may then transmit portions of the authentication bits string as described above.

In some aspects of the present disclosure, the length of bits 206 may be dedicated to the communication of payload data (e.g., the payload length 210 of bits) between parties. For example, an attacker 108 may be able to jam a message portion (e.g., the message length 208 of bits) of a transmission, but not the preamble portion (e.g., the effective preamble length 204 and the length of bits 206). In such aspects, the example method 300 may include encoding a first set of bits of a message. For example, the transmitter 110 may encode a set of bits of a message equal to the length of bits 206 for a particular time slot. The encoded first set of bits of the message may be added to the string of bits for transmission. After the first transmission, a second set of bits of the message may be encoded and added to a new string of bits for a second transmission. As with the authentication string of bits above, the lengths of the encoded sets of bits of the message may vary between time slots. As each portion of a message is transmitted, another portion of the message is transmitted as well. The process may continue until each portion of the message is transmitted both as encoded sets of bits and as a typical message portion.

Figure 4:
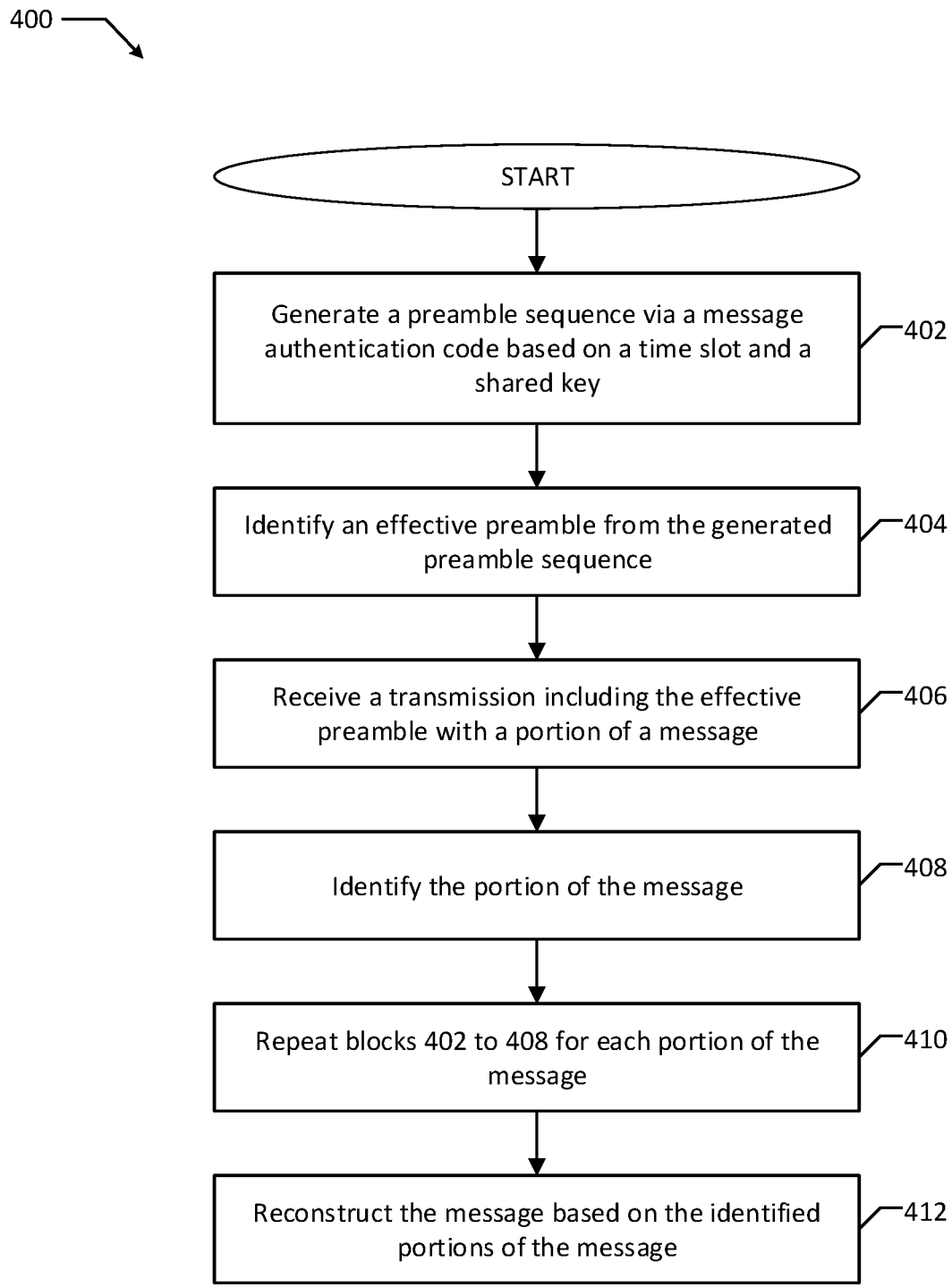
FIG. 4 illustrates a flowchart of an example method for receiving a message with dynamic preambles, according to an aspect of the present disclosure.

FIG. 4 illustrates a flowchart of an example method 400 for receiving a message with dynamic preambles. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

A preamble sequence is generated via a MAC based on a time slot and a shared key (block 402). In an example, the receiver 120 is programmed to input a first time slot and the shared key 130B into the MAC 132B to obtain an output that is the preamble sequence. A portion of the generated preamble sequence is then identified as an effective preamble (block 404). As described above, the effective preamble may be identified according to predetermined rules for the first time slot. For instance, the predetermined rules for the first time slot in the example above are that the four most significant bits of the generated preamble sequence are designated as the effective preamble. As such, in this example, the receiver 120 is programmed to identify the four most significant bits of the generated preamble sequence as the effective preamble so that when the receiver 120 receives a transmission including the effective preamble, the receiver 120 recognizes that a message is being received.

A transmission is then received including the effective preamble with a portion of the message (block 406). For example, the receiver 120 receives the string of bits from the transmitter 110 that includes the effective preamble followed by the first portion of the message. The portion of the message may then be identified (block 408). For instance, based on the predetermined rules, the receiver 120 is able to identify the message in the received string of bits. The receiver 120 may store or otherwise temporarily retain the portion of the message until all of the message portions are received. After the first portion of the message is received with its effective preamble, the process is repeated for each remaining portion of the message (block 410). For instance, the receiver 120 may input a second time slot and the shared key 130B into the MAC 132B to obtain a preamble sequence. A portion of the preamble sequence is identified as an effective preamble based on the predetermined rules for the second time slot. For example, the predetermined rules for the second time slot are to skip the four most significant bits of the generated preamble sequence and designate the next seven bits as the effective preamble. The receiver 120 may then receive the string of bits from the transmitter 110 that includes this effective preamble followed by the second portion of the message. The receiver 120 identifies the second portion of the message, and in some instances stores it.

This process repeats until the receiver 120 receives each portion of the message. Once the receiver 120 receives each portion of the message, the receiver 120 is programmed to reconstruct the message (block 412). For example, the receiver 120 may string together each received portion of the message in the order in which it was received.

Consistent with the aspects described above, each portion of the message may be received within its own respective time slot. Alternatively, more than one message portion may be received within a single time slot. In such alternative aspects, the message portions received within the same time slot have the same effective preamble. Each of the message portions may be received in directly subsequent time slots or in some cases one or more time slots may elapse between receiving portions of a message.

As described above, the transmitter 110 may encrypt information prior to transmitting it to the receiver 120 in a way that is only recoverable by the party receiving the information at the receiver 120. In such instances, the receiver 120 may be programmed to decrypt the encrypted information. The transmitter 110 may be programmed to enrich the transmitted information with a forward error mechanism (FEC). In such instances, the receiver 120 may reconstruct the message even in the presence of transmission errors.

As described above, in some aspects of the present disclosure, the transmitter 110 may transmit an authentication measure to the receiver 120. In such aspects, the example method 400 may include receiving the portions of the authentication bits string with the effective preambles and the portions of the message. The receiver 120 may then reconstruct the authentication bits string after receiving each of the transmission. For example, the receiver 120 may string together each received portion of the authentication bits string in the order in which it was received.

In the example in which the transmitter 110 generates an authentication bits string by inputting its identifier and the shared key 130A into the MAC 132A, the receiver 120 may store the identifier of the transmitter 110. The receiver 120 may be programmed to input the stored identifier for the transmitter 110 with the shared key 130B into the MAC 132B to generate an authentication bits string. The receiver 120 may then compare the reconstructed authentication bits string with the generated authentication bits string. If the two bit strings match, then it is verified that the transmitter 110 has access to the shared key 130A, which indicates that the transmission is likely authentic. If the two bit strings do not match, then authentication fails, which may indicate that the transmission was sent by an attacker 108 attempting to impersonate the transmitter 110.

In the example in which the transmitter 110 generates an authentication bits string by inputting the message to be transmitted and the shared key 130A into the MAC 132A, the receiver 120 may be programmed to reconstruct the message and input the reconstructed message with the shared key 130B into the MAC 132B. Doing so generates an authentication bits string. The receiver 120 may then compare the reconstructed authentication bits string with the generated authentication bits string. If the two bit strings match, then it is verified that the transmitter 110 has access to the shared key 130A, which indicates that the transmission is likely authentic. If the two bit strings do not match, then authentication fails, which may indicate that the transmission was sent by an attacker 108 attempting to impersonate the transmitter 110.

Also described above, in some aspects, the length of bits 206 may be dedicated to the communication of payload data (e.g., the payload length 210 of bits) between parties. In such aspects, the example method 400 may include receiving the encoded sets of bits of the message with the effective preamble and the portions of the message. For example, the receiver 120 may receive an encoded set of bits of a message equal to the length of bits 206 for a particular time slot. After receiving the first transmission, a second encoded set of bits of the message may be received with a second effective preamble and a second message portion. The process may continue until each portion of the message is received both as encoded sets of bits and as a typical message portion. Once each portion of the message is received, the message may be reconstructed via the encoded sets of bits of the message. For example, the receiver 120 may string together each received encoded set of bits of the message in the order in which it was received. For instance, in this example an attacker 108 may be able to jam a message portion, and thus the message cannot be reconstructed using the message portions. The attacker 108, however, cannot jam the preamble portion so the message may be reconstructed via the encoded sets of bits of the message since they are transmitted as part of a typical preamble of a typical communication technology.

Figure 5:
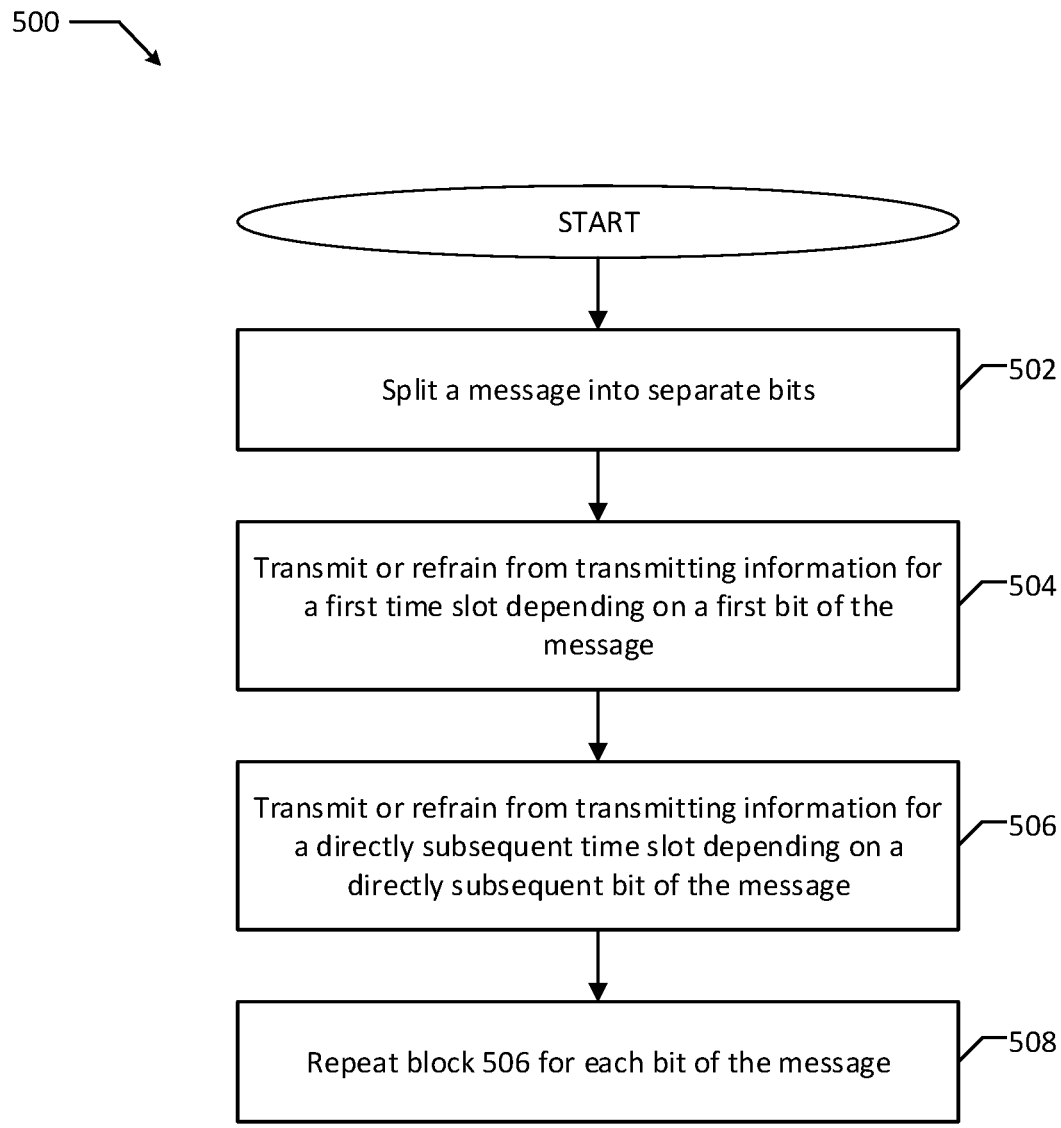
FIG. 5 illustrates a flowchart of an example method for transmitting a message in the presence of a reactive jammer, according to an aspect of the present disclosure.

FIG. 5 illustrates a flowchart of an example method 500 for transmitting a message in the presence of a reactive jammer. For example, an attacker 108 may aim to disrupt the operation of a specific protocol or communication technology, while at the same time allowing the correct operation of other communication technologies sharing the same spectrum as the one the attacker 108 aims to disrupt. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

A message to be transmitted is split into separate bits (block 502). In an example, a message may include the string of bits "1010" and the transmitter 110 may split the message into its separate bits "1", "0", "1", and "0". It should be appreciated that this is a simplified example and that messages will typically include more than four bits.

Depending on the first bit of the message, for a first time slot, information is either transmitted or it is not (block 504). For example, the bit "0" may be associated with the absence of any transmission whereas the bit "1" may be associated with a transmission. In other examples the associations may be reversed. Assuming that the bit "1" is associated with a transmission, the transmitter 110 transmits information for a first time slot because the first bit in the message string is "1". The information transmitted may be a random message or any type of information. In this example method, it does not matter the information that is transmitted, only that information is in fact transmitted. For instance, given that there is a reactive jammer active on the communication channel, the reactive jammer will detect the transmission of information and will start jamming it. A receiver (e.g., the receiver 120) will detect the start of the transmission, and even though the receiver 120 might not receive decipherable information because it is jammed, the receiver 120 will log a bit "1" as a received bit since a transmission was detected. Stated differently, the receiver 120 logs a bit "1" because it detects a transmission during a time slot independently of the information that was received in the transmission.

Depending on the directly subsequent bit of the message, for a directly subsequent time slot, information is either transmitted or it is not (block 506). For example, because the next bit in the message is "0", the transmitter 110 does not transmit any information for the next time slot. A receiver (e.g., the receiver 120) is programmed to wait for a maximum duration of time (e.g., the duration of the time slot). If the receiver 120 does not detect a transmission within that duration of time, the receiver 120 logs a bit "0" as the next bit in the message. In this example, the receiver 120 has now logged "10". Because a lack of a transmission is associated with a result (e.g., the receiver 120 logging a "0" bit), the example method 500 is conducted in subsequent time slots. For instance, the transmitter 110 cannot merely skip a time slot because the receiver 120 will log a "0" bit, which will alter the final message that the receiver 120 constructs. As in other examples described above, the time slots may have different durations that are predetermined by the transmitter 110 and the receiver 120.

The process may then be repeated for each subsequent bit of the message for each subsequent time slot until each separate bit of the message is transmitted (block 508). For example, because the next bit in the message is "1", the transmitter 110 transmits information including a random message. The receiver 120 detects a transmission and logs a bit "1" as the next received bit. In this example, the receiver 120 has now logged "101". Then, because the next bit in the message is "0", the transmitter 110 does not transmit any information for the next time slot. The receiver 120 waits a maximum duration of time, and not detecting a transmission, logs a bit "0" as the next bit in the message. In this example, the receiver 120 has now logged "1010", which completes the message.

While the reactive jammer may be able to jam the messages of each transmission between the transmitter 110 and the receiver 120, the receiver 120 still receives the ultimate message. Additionally, an attacker 108 will not be able to decipher the ultimate message that is transmitted. For instance, an attacker 108 will not know the duration of the respective time slots, and therefore will not know how may bits of "0" the receiver 120 logs between transmissions even if the attacker 108 were to realize that the receiver 120 is logging bits of "1" when a transmission is detected.

Figure 6:
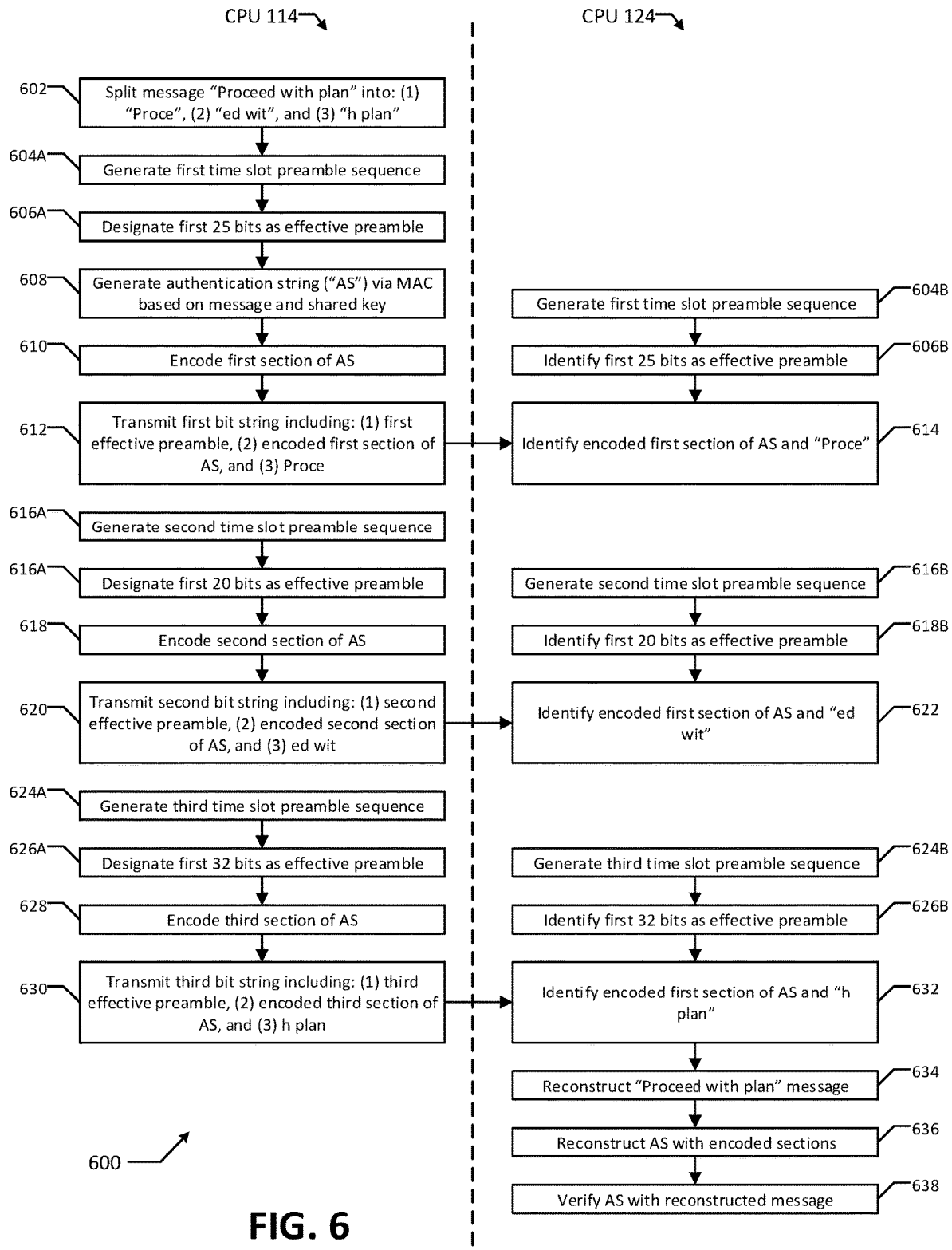
FIG. 6 illustrates a flow diagram of an example method for securely transmitting a military order to a receiver, according to an aspect of the present disclosure.

FIG. 6 illustrates a flow diagram of an example method 600 for securely transmitting a military order to a receiver. For example, a command headquarters may want to transmit an order to "Proceed with the plan" to an active duty military unit and the command headquarters does not want the message to get intercepted or jammed by an enemy force. It is also important in this example that the active duty military unit is able to authenticate that the message it receives originated from the command headquarters and not an impersonator, such as the enemy force. It should be appreciated that the message is illustrated in lettered format for illustrated purposes only and that the message is transmitted in bit form. Although the example method 600 is described with reference to the flowchart illustrated in FIG. 6, it will be appreciated that many other methods of performing the acts associated with the method 600 may be used. For example, the order of some of the blocks may be changed, certain blocks may be combined with other blocks, and some of the blocks described are optional. The method 600 may be performed by processing logic that may comprise hardware (circuitry, dedicated logic, etc.), software, or a combination of both.

The CPU 114 of the transmitter 110 may first split the message into three portions of bits (block 602). For instance, "Proce" corresponds to a first set of bits, "ed wit" corresponds to a second set of bits, and "h plan" corresponds to a third set of bits. The CPU 114 may then generate a preamble sequence for the first time slot (block 604A). For instance, the CPU 114 generates the preamble sequence via inputting the first time slot and the shared key 130A into the MAC 132A. In this example, at some time prior to receiving the first transmission, the CPU 124 of the receiver 120 also generates the same preamble sequence for the first time slot as the CPU 114 (block 604B). For instance, the CPU 124 generates the preamble sequence via inputting the first time slot and the shared key 130B into the MAC 132B. In other examples, the CPU 124 may generate the preamble sequence after receiving a transmission.

The CPU 114 then designates a portion of the first time slot preamble sequence as an effective preamble (block 606A). This is done based on predetermined rules shared between the CPU 114 and the CPU 124. For instance, the CPU 114 designates the twenty-five most significant bits (e.g., the first twenty-five) of the first time slot preamble sequence as the effective preamble. In this example, the CPU 124 identifies an effective preamble from the first time slot preamble sequence prior to receiving a transmission (block 606B). The CPU 124 identifies the effective preamble according to the shared predetermined rules.

In this example, the CPU 114 generates an authentication bits string via inputting the message and the shared key 130A into the MAC 132A (block 608). The CPU 114 encodes a first section of the authentication bits string (block 610). The first section of the authentication bits string has a bit length equal to the length of bits 206 portion of the bit string to be transmitted for the first time slot. The length of bits 206 portion depends on the effective preamble length 204 of the effective preamble for the first time slot. The CPU 114 then transmits a first bit string including the first effective preamble, followed by the encoded first section of the authentication string, followed by the bit form of "Proce" (block 612). The CPU 124 receives the first bit string and identifies both the encoded first section of the authentication string and the bit form of "Proce" (block 614). For instance, the CPU 124 is able to identify the effective preamble so it is able to identify the authentication string and the message. The CPU 124 may store the encoded first section of the authentication string and the bit form of "Proce" in the memory 122.

The CPU 114 may then generate a preamble sequence for the second time slot (block 616A). For instance, the CPU 114 generates the preamble sequence via inputting the second time slot and the shared key 130A into the MAC 132A. The CPU 124 of the receiver 120 also generates the same preamble sequence for the second time slot as the CPU 114 (block 616B). For instance, the CPU 124 generates the preamble sequence via inputting the second time slot and the shared key 130B into the MAC 132B. The CPU 114 then designates a portion of the second time slot preamble sequence as an effective preamble (block 616A). This is done based on the predetermined rules shared between the CPU 114 and the CPU 124. For instance, the CPU 114 designates the twenty most significant bits (e.g., the first twenty) of the second time slot preamble sequence as the effective preamble. In this example, the CPU 124 identifies an effective preamble from the second time slot preamble sequence prior to receiving a transmission (block 616B). The CPU 124 identifies the effective preamble according to the shared predetermined rules.

The CPU 114 then encodes a second (e.g., the next subsequent) section of the authentication bits string (block 618). The second section of the authentication bits string has a bit length equal to the length of bits 206 portion of the bit string to be transmitted for the second time slot. The length of bits 206 portion depends on the effective preamble length 204 of the effective preamble for the second time slot. The CPU 114 then transmits a second bit string including the second effective preamble, followed by the encoded second section of the authentication string, followed by the bit form of "ed wit" (block 620). The CPU 124 receives the second bit string and identifies both the encoded second section of the authentication string and the bit form of "ed wit" (block 622). For instance, the CPU 124 is able to identify the effective preamble so it is able to identify the authentication string and the message. The CPU 124 may store the encoded second section of the authentication string and the bit form of "ed wit" in the memory 122.

The CPU 114 may then generate a preamble sequence for the third time slot (block 624A). For instance, the CPU 114 generates the preamble sequence via inputting the third time slot and the shared key 130A into the MAC 132A. The CPU 124 of the receiver 120 also generates the same preamble sequence for the third time slot as the CPU 114 (block 624B). For instance, the CPU 124 generates the preamble sequence via inputting the third time slot and the shared key 130B into the MAC 132B. The CPU 114 then designates a portion of the third time slot preamble sequence as an effective preamble (block 626A). This is done based on the predetermined rules shared between the CPU 114 and the CPU 124. For instance, the CPU 114 designates the thirty-two most significant bits (e.g., the first thirty-two) of the third time slot preamble sequence as the effective preamble. In this example, the CPU 124 identifies an effective preamble from the third time slot preamble sequence prior to receiving a transmission (block 626B). The CPU 124 identifies the effective preamble according to the shared predetermined rules.

The CPU 114 then encodes a third (e.g., the next subsequent) section of the authentication bits string (block 628). The third section of the authentication bits string has a bit length equal to the length of bits 206 portion of the bit string to be transmitted for the third time slot. The length of bits 206 portion depends on the effective preamble length 204 of the effective preamble for the third time slot. The CPU 114 then transmits a third bit string including the third effective preamble, followed by the encoded third section of the authentication string, followed by the bit form of "h plan" (block 630). The CPU 124 receives the third bit string and identifies both the encoded third section of the authentication string and the bit form of "h plan" (block 632). For instance, the CPU 124 is able to identify the effective preamble so it is able to identify the authentication string and the message. The CPU 124 may store the encoded third section of the authentication string and the bit form of "h plan" in the memory 122.

The CPU 124 may then reconstruct the message (block 634). For instance, the CPU 124 may string together the bit form of "Proce", with the bit form of "ed wit", and with the bit form of "h plan" in the order in which they were received to obtain the bit form of "Proceed with plan". The CPU 124 also reconstructs the authentication bit string with the received encoded sections (block 636). For instance, the CPU 124 may string together the encoded sections in the order in which they were received to obtain the authentication bits string. The CPU 124 may then verify the authentication bits string using the reconstructed message (block 638). To do so, the CPU 124 inputs the reconstructed message and the shared key 130B into the MAC 132B to obtain a generated authentication bits string. The CPU 124 then compares the generated authentication bits string with the reconstructed authentication bits string. If they match, then it is verified that the transmitter 110 has access to the shared key 130A, which indicates that the transmission is likely authentic. The active duty military unit therefore receives the message without it being jammed and authenticates the message so that the unit may carry out the order in the message.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A system for communicating messages over a wireless network, the system comprising:
   a transmitting device including:
      a first memory, and
      a first processor in communication with the first memory, the first processor configured to:
         generate a first preamble sequence of a wireless communication, for a first time slot, via a message authentication code based on the first time slot and a shared cryptographic key, wherein the first preamble sequence includes a plurality of bits,
         designate a first predetermined portion of bits of the first preamble sequence as a first effective preamble, wherein the first predetermined portion of bits includes a first predetermined quantity of bits and a first predetermined location of the bits within the first preamble sequence, and
         transmit the first effective preamble with a first portion of a message; and
   a receiving device including:
      a second memory, and
      a second processor in communication with the second memory, the second processor configured to:
         generate the first preamble sequence for the first time slot via the message authentication code based on the first time slot and the shared cryptographic key,
         identify the first predetermined portion of bits of the first preamble sequence as the first effective preamble,
         receive from the transmitting device the first effective preamble with the first portion of the message, and
         identify the first portion of the message.

2. The system of claim 1, wherein
the first processor of the transmitting device is further configured to:
   generate a second preamble sequence of a second wireless communication for a second time slot via the message authentication code based on the second time slot and the shared cryptographic key, wherein the second preamble sequence includes a plurality of bits, and wherein the second time slot is subsequent to the first time slot,
   designate a second predetermined portion of bits of the second preamble sequence as a second effective preamble, wherein the second predetermined portion of bits includes a second predetermined quantity of bits and a second predetermined location of the bits within the second preamble sequence, and
   transmit the second effective preamble with a second portion of the message; and
the second processor of the receiving device is further configured to:
   generate the second preamble sequence for the second time slot via the message authentication code based on the second time slot and the shared cryptographic key,
   identify the second predetermined portion of bits of the second preamble sequence as the second effective preamble,
   receive from the transmitting device the second effective preamble with the second portion of the message, and
   identify the second portion of the message.

3. The system of claim 2, wherein the first predetermined quantity of bits is different than the second predetermined quantity of bits.

4. The system of claim 2, wherein the first predetermined quantity of bits is equal to the second predetermined quantity of bits.

5. The system of claim 2, wherein the first predetermined location of the bits is different than the second predetermined location of the bits.

6. The system of claim 2, wherein the first predetermined location of the bits is the same as the second predetermined location of the bits.

7. The system of claim 2, wherein the first time slot includes a first duration, the second time slot includes a second duration, and the first duration is different that the second duration.

8. The system of claim 2, wherein the second processor of the receiving device is further configured to reconstruct the message based on the first portion and the second portion of the message.

9. The system of claim 1, wherein the predetermined location of bits is a location of the most significant bits of the preamble sequence.

10. The system of claim 1, wherein the message authentication code is a hash-based message authentication code.

11. The system of claim 1, wherein the message is split into a plurality of portions, each respective message portion corresponding to a respective time slot, and wherein the first processor of the transmitting device is further configured to:
   generate a respective preamble sequence of a respective wireless communication for each respective time slot, designate a respective effective preamble for each respective preamble sequence, transmit each respective effective preamble with its corresponding respective message portion, wherein each respective transmission is conducted within a respective time slot.

12. A method for communicating messages over a wireless network, the method comprising:

generating a first preamble sequence of a first wireless communication for a first time slot via a message authentication code based on the first time slot and a shared cryptographic key, wherein the first preamble sequence includes a plurality of bits, designating a first predetermined portion of bits of the first preamble sequence as a first effective preamble, wherein the first predetermined portion of bits includes a first predetermined quantity of bits and a first predetermined location of the bits within the first preamble sequence, transmitting the first effective preamble with a first portion of a message, generating a second preamble sequence of a second wireless communication for a second time slot via the message authentication code based on the second time slot and the shared cryptographic key, wherein the second preamble sequence includes a plurality of bits, and wherein the second time slot is subsequent to the first time slot, designating a second predetermined portion of bits of the second preamble sequence as a second effective preamble, wherein the second predetermined portion of bits includes a second predetermined quantity of bits and a second predetermined location of the bits within the second preamble sequence, and transmitting the second effective preamble with a second portion of the message.

13. The method of claim 12, wherein the first predetermined quantity of bits is different than the second predetermined quantity of bits.

14. The method of claim 12, further comprising:

generating an authentication bits string via the message authentication code based on an authenticator and the shared cryptographic key, encoding a first section of the authentication bits string, transmitting the first effective preamble with the encoded first section of the authentication bits string and the first portion of the message, encoding a second section of the authentication bits string, the second section different than the first section, and transmitting the second effective preamble with the encoded second section of the authentication bits string and the second portion of the message.

15. The method of claim 14, wherein the authenticator is the message or an identifier.

16. The method of claim 12, further comprising:

encoding a first set of bits of the message, transmitting the first effective preamble with the first encoded set of bits of the message and the first portion of the message, encoding a second set of bits of the message, the second set different than the first second, and transmitting the second effective preamble with the second encoded set of bits of the message and the second portion of the message.

17. A method for communicating messages over a wireless network, the method comprising:

generating a first preamble sequence of a first wireless communication for a first time slot via a message authentication code based on the first time slot and a shared cryptographic key, wherein the first preamble sequence includes a plurality of bits, identifying a first predetermined portion of bits of the first preamble sequence as a first effective preamble, wherein the first predetermined portion of bits includes a first predetermined quantity of bits and a first predetermined location of the bits within the first preamble sequence, receiving the first wireless communication including the first effective preamble with a first portion of a message, identifying the first portion of the message, generating a second preamble sequence of a second wireless communication for a second time slot via a message authentication code based on the second time slot and the shared cryptographic key, wherein the second preamble sequence includes a plurality of bits, and wherein the second time slot is subsequent to the first time slot, identifying a second predetermined portion of bits of the second preamble sequence as a second effective preamble, wherein the second predetermined portion of bits includes a second predetermined quantity of bits and a second predetermined location of the bits within the second preamble sequence, receiving the second wireless communication including the second effective preamble with a second portion of the message, identifying the second portion of the message, and reconstructing the message based on the first portion and the second portion of the message.

18. The method of claim 17, further comprising:

receiving the first effective preamble with an encoded first section of an authentication bits string and the first portion of the message, receiving the second effective preamble with an encoded second section of the authentication bits string and the second portion of the message, reconstructing an authentication bits string based on the encoded first section and second section of the authentication bits string, generating an authentication bits string via the message authentication code based on the message and the shared cryptographic key, and comparing the reconstructed authentication bits string with the generated authentication bits string to authenticate the message.

19. The method of claim 17, wherein the first predetermined location of the bits is different than the second predetermined location of the bits.

20. The method of claim 17, further comprising:

receiving the first effective preamble with a first encoded set of bits of the message and the first portion of the message, receiving the second effective preamble with a second encoded set of bits of the message and the second portion of the message, and reconstructing the message based on the first and second encoded sets of bits of the message.

* * * * *